(12) United States Patent
Leone

(10) Patent No.: US 9,327,708 B2
(45) Date of Patent: May 3, 2016

(54) SYSTEMS AND METHODS FOR IMPROVING TORQUE RESPONSE OF AN ENGINE

(71) Applicant: Ford Global Technologies, LLC, Dearborn, MI (US)

(72) Inventor: Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 14/260,970

(22) Filed: Apr. 24, 2014

(65) Prior Publication Data
US 2015/0307076 A1     Oct. 29, 2015

(51) Int. Cl.
| | |
|---|---|
| B60W 10/02 | (2006.01) |
| B60W 10/06 | (2006.01) |
| B60W 10/10 | (2012.01) |
| B60W 10/00 | (2006.01) |
| F02D 41/00 | (2006.01) |
| F02D 41/38 | (2006.01) |
| F02D 41/02 | (2006.01) |
| F02D 41/08 | (2006.01) |
| F02M 21/02 | (2006.01) |
| F02D 19/02 | (2006.01) |
| F02D 41/10 | (2006.01) |
| F02B 23/10 | (2006.01) |
| F02D 13/02 | (2006.01) |

(52) U.S. Cl.
CPC ............... *B60W 10/06* (2013.01); *B60W 10/00* (2013.01); *B60W 10/10* (2013.01); *F02D 19/024* (2013.01); *F02D 41/0027* (2013.01); *F02D 41/0205* (2013.01); *F02D 41/08* (2013.01); *F02D 41/38* (2013.01); *F02M 21/0275* (2013.01); *F02M 21/0278* (2013.01); *F02B 23/104* (2013.01); *F02D 13/0265* (2013.01); *F02D 41/0025* (2013.01); *F02D 41/10* (2013.01); *F02D 2041/389* (2013.01); *F02D 2200/0602* (2013.01); *Y02T 10/32* (2013.01)

(58) Field of Classification Search
None
See application file for complete search history.

(56) References Cited

U.S. PATENT DOCUMENTS

| | | | |
|---|---|---|---|
| 5,117,802 A | 6/1992 | Durbin | |
| 5,713,336 A | 2/1998 | King et al. | |
| 5,868,122 A * | 2/1999 | Gram | ............. F02D 19/022 123/527 |
| 5,941,210 A | 8/1999 | Hill et al. | |

(Continued)

FOREIGN PATENT DOCUMENTS

| | | |
|---|---|---|
| EP | 1990272 B1 | 5/2011 |
| EP | 1856392 B1 | 12/2011 |
| WO | 0041905 A1 | 7/2000 |

OTHER PUBLICATIONS

Gunther, Marco et al., "Effects of LPG fuel formulations and mixture formation systems on the combustion system of a boosted SI engine," 22nd Aachen Colloquium Automobile and Engine Technology 2013, Eurogress Aachen, Germany, Oct. 7-9, 2013, 28 pages.
adillo, Ed et al., "Method and System for Engine Control," U.S. Appl. No. 13/754,667, filed Jan. 30, 2013, 39 pages.
Badillo, Ed et al., "Method and System for Engine Control," U.S. Appl. No. 13/841,611, filed Mar. 15, 2013, 38 pages.

(Continued)

*Primary Examiner* — Edwin A Young
(74) *Attorney, Agent, or Firm* — Julia Voutyras; Alleman Hall McCoy Russell & Tuttle LLP

(57) ABSTRACT

Systems and methods for improving engine torque response are presented. In one example, engine idle speed is increased to shorten engine torque response based on engine operating conditions. The methods and systems may be useful for operating an engine that is supplied a gaseous fuel.

20 Claims, 8 Drawing Sheets

(56) References Cited

U.S. PATENT DOCUMENTS

| | | | |
|---|---|---|---|
| 6,145,494 | A | 11/2000 | Klopp |
| 7,140,354 | B1 * | 11/2006 | Hashemi ............ F02D 41/0027 123/456 |
| 7,703,435 | B2 | 4/2010 | Surnilla et al. |
| 7,918,207 | B2 | 4/2011 | Pursifull et al. |
| 7,950,370 | B2 | 5/2011 | Lucas et al. |
| 8,342,158 | B2 | 1/2013 | Ulrey et al. |
| 8,413,643 | B2 | 4/2013 | Pursifull et al. |
| 2004/0139944 | A1 | 7/2004 | Nakano et al. |
| 2010/0126468 | A1 | 5/2010 | Martin |
| 2010/0318277 | A1 | 12/2010 | Pursifull et al. |
| 2011/0061622 | A1 | 3/2011 | Lund |
| 2012/0216773 | A1 | 8/2012 | Brewster et al. |
| 2013/0000607 | A1 | 1/2013 | Watanabe |
| 2013/0005532 | A1 * | 1/2013 | Gibson ............... B60W 10/026 477/115 |
| 2013/0104997 | A1 * | 5/2013 | Harper ..................... F17D 3/01 137/12 |
| 2013/0160747 | A1 | 6/2013 | Gibson et al. |
| 2013/0197777 | A1 | 8/2013 | Sloan et al. |
| 2013/0233284 | A1 | 9/2013 | Thaysen et al. |
| 2013/0238217 | A1 | 9/2013 | Nolan et al. |
| 2013/0238226 | A1 | 9/2013 | Slaymaker et al. |
| 2013/0255636 | A1 | 10/2013 | Pursifull |
| 2013/0255646 | A1 | 10/2013 | Ulrey et al. |

OTHER PUBLICATIONS

Leone, Thomas G. et al., "Refueling Systems and Methods for Mixed Liquid and Gaseous Fuel," U.S. Appl. No. 14/051,312, filed Oct. 10, 2013, 36 pages.

Leone, Thomas G. et al., "Usage Strategy for Mixed Gasoline and CNG Fueled Vehicles," U.S. Appl. No. 14/051,333, filed Oct. 10, 2013, 36 pages.

Greiner, Christopher M. et al., "Method for Adjusting Fan and Compressor Power for a Vehicle Cabin Heating System," U.S. Appl. No. 14/098,328, filed Dec. 5, 2013, 32 pages.

Leone, Thomas G. et al., "Systems and Methods for Determining Amount of Liquid and Gaseous Fuel," U.S. Appl. No. 14/151,683, filed Jan. 9, 2014, 39 pages.

Leone, Thomas G. et al., "Systems and Methods for Separation of Liquid and Gaseous Fuel for Injection," U.S. Appl. No. 14/152,869, filed Jan. 10, 2014, 37 pages.

Leone, Thomas G., "Systems and Methods for Supplying Gaseous Fuel to an Engine," U.S. Appl. No. 14/260,947, filed Apr. 24, 2014, 53 pages.

Dearth, Mark A., "Dual Fuel Refueling," U.S. Appl. No. 14/275,596, filed May 12, 2014, 40 pages.

Anonymous, "In-Situ Automotive Gaseous Fuel System Leak Check Method," IPCOM No. 000124730, Published May 4, 2005, 2 pages.

* cited by examiner

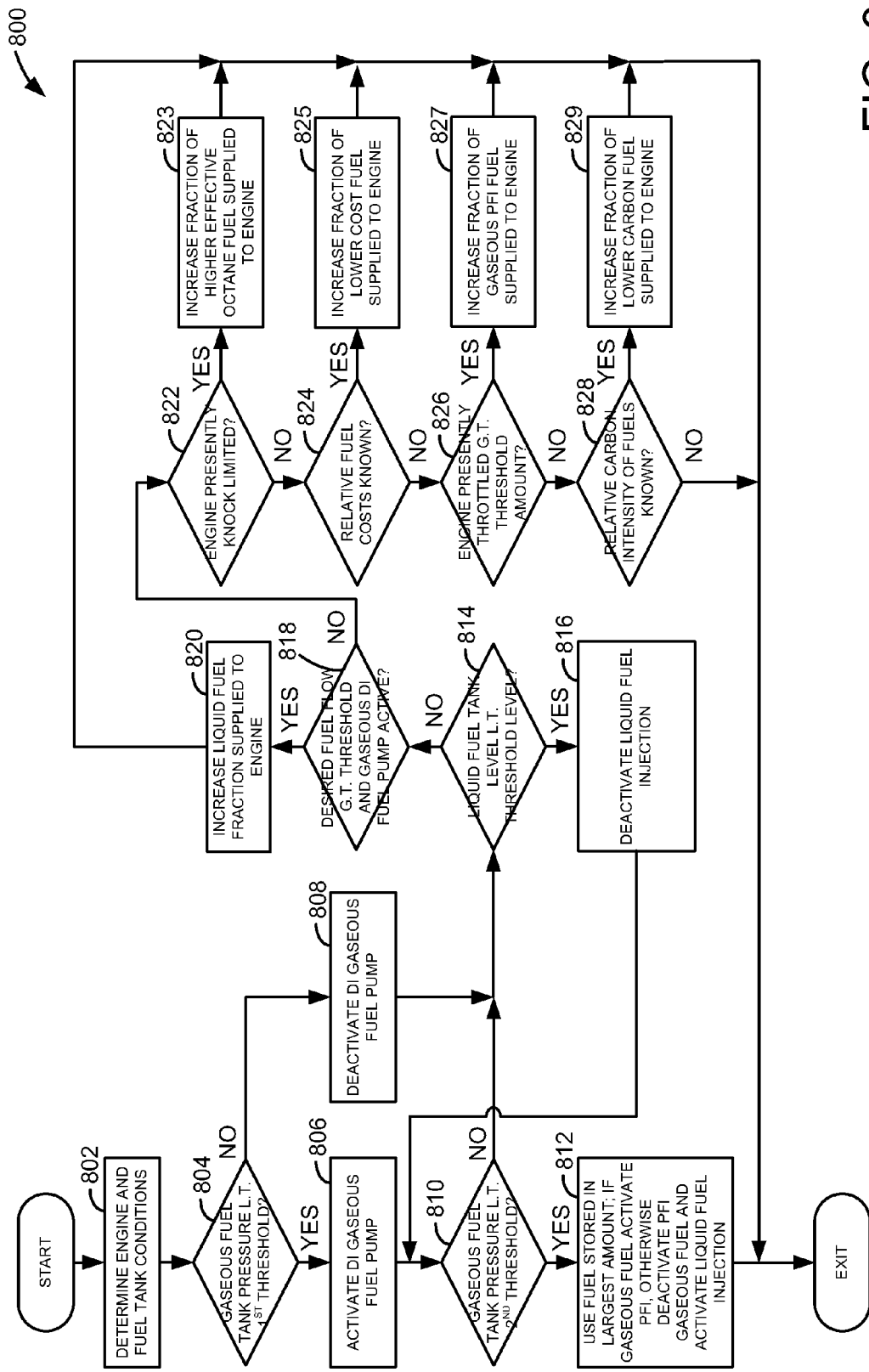

__US 9,327,708 B2__

SYSTEMS AND METHODS FOR IMPROVING TORQUE RESPONSE OF AN ENGINE

FIELD

The present description relates to systems and methods for improving torque response of an engine. The methods may be particularly useful for engines that may exhibit a lag in torque production in response to an increase in engine torque demand.

BACKGROUND AND SUMMARY

Engine torque may be increased in response to a change in a requested or desired engine torque. Engine torque may be increased via increasing an amount of air and fuel supplied to the engine, at least up to a condition where the engine lacks capacity to induct additional air into engine cylinders. The amount of fuel supplied to the engine may be increased as the amount of air inducted to the engine increases such that the engine operates near stoichiometric conditions. However, there may be conditions where the amount of air inducted to engine cylinders is less than desired. For example, if the engine is supplied gaseous fuel, the gaseous fuel may displace some air in the cylinder, thereby limiting the amount of torque the engine may produce. Consequently, a desired engine torque response may not be provided.

The inventor herein has recognized the above-mentioned disadvantages and has developed an engine operating method, comprising: directly injecting a gaseous fuel to an engine in response to a pressure of gaseous fuel stored in a fuel tank exceeding a threshold level; and increasing an idle speed of the engine and injecting the gaseous fuel to an engine air intake in response to the amount of gaseous fuel stored in the fuel tank being less than the threshold level.

By increasing idle speed of an engine in response to a pressure of fuel stored in a fuel tank, it may be possible to improve an engine's torque response. For example, if a gaseous fuel is directly injected to engine cylinders, the engine may respond quickly to an increase in desired engine torque. However, if the engine transitions to injecting the gaseous fuel via engine intake injection (e.g., injecting fuel to an engine intake manifold or intake ports) when higher pressure gaseous fuel is not available from the gaseous fuel storage tank, engine output torque at engine idle may not respond as quickly as is desired. The engine torque response at lower engine speeds may be dampened since the engine may generate less torque at lower engine speeds because a portion of cylinder volume may be displaced by fuel. However, if engine idle speed is increased, engine power output may increase more rapidly in a short period of time since more combustion events occur for each second of engine operation. Thus, performance of an engine having engine intake injection may be improved so that vehicle acceleration may be more consistent between direct injection and engine intake injection modes.

The present description may provide several advantages. In particular, the approach may reduce improve engine torque response. Further, the approach may make changes between fuel injection modes less noticeable to a driver. Further still, the approach may extend a vehicle's travel range while operating on a gaseous fuel.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIGS. 7 and 8 show example methods for operating a vehicle.

DETAILED DESCRIPTION

Figure 1:
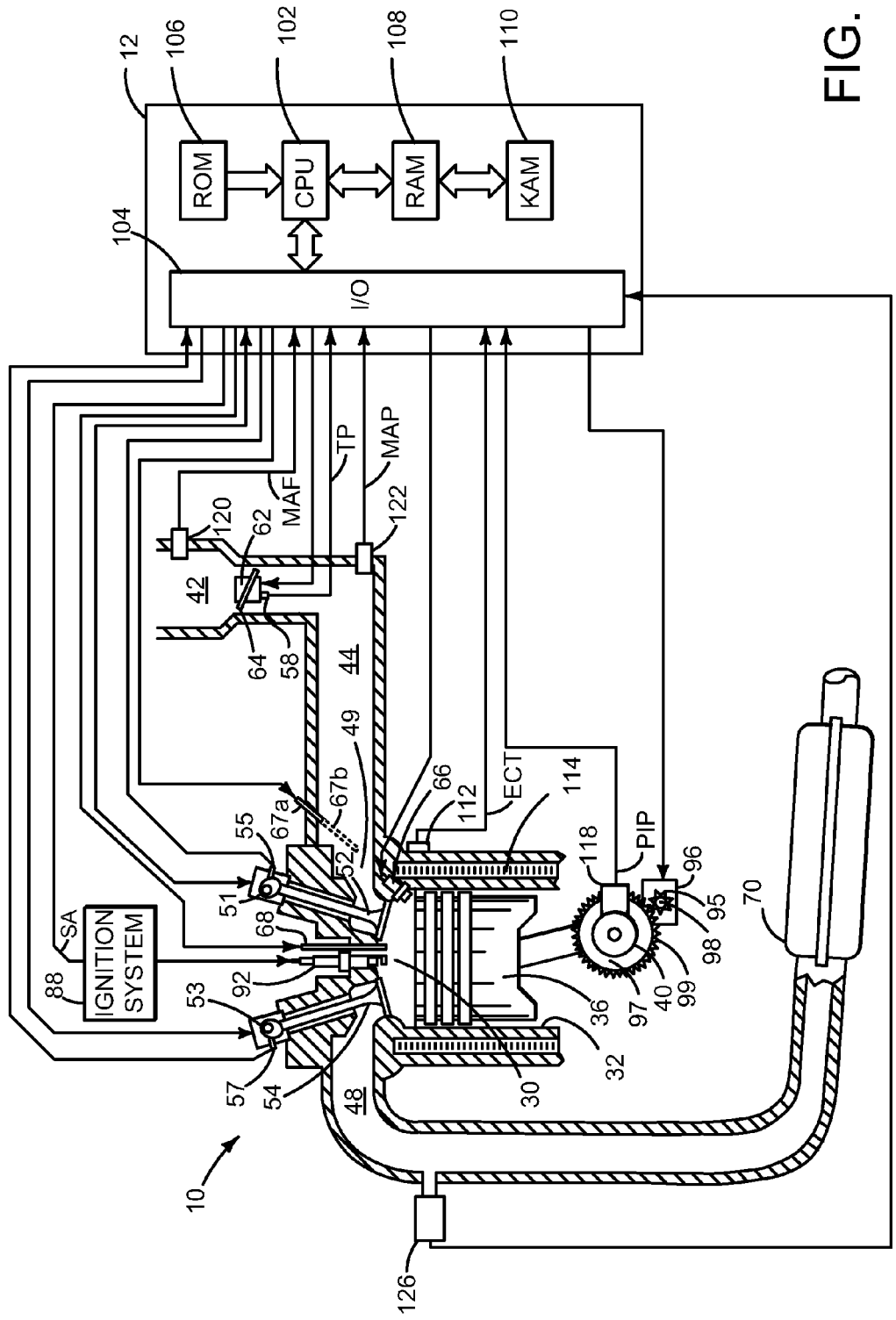
FIG. 1 is a schematic diagram of an engine.
Figure 2:
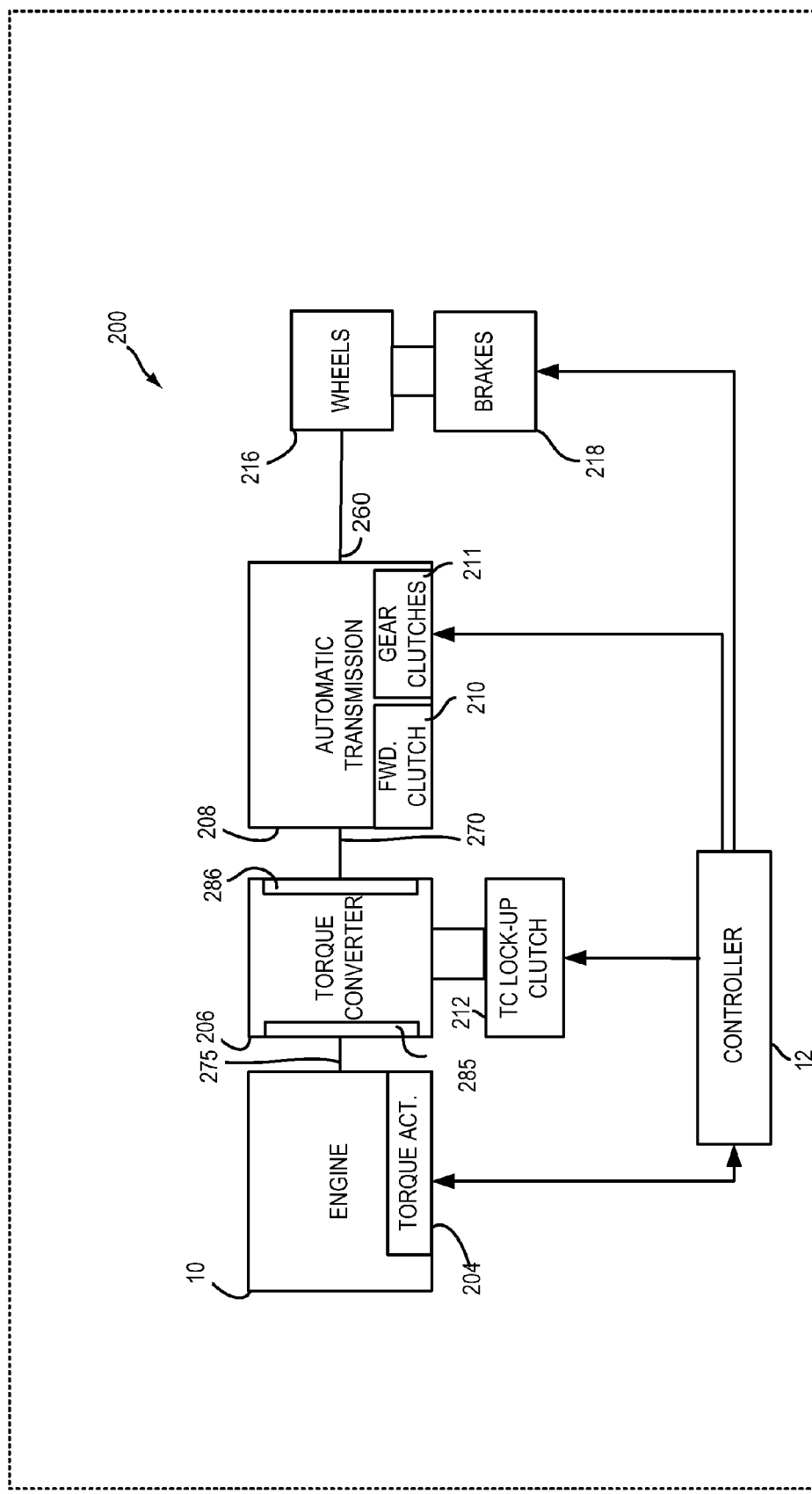
FIG. 2 is shows an example vehicle driveline configuration.

The present description is related to operating a vehicle that includes an internal combustion engine. The engine may be configured as shown in FIG. 1. The engine may be mechanically coupled to other vehicle components to form a driveline as shown in FIG. 2. The engine may be supplied gaseous and/or liquid fuel via one of the systems shown in FIGS. 3 and 4. The vehicle may operate according to the simulated operating sequences shown in FIGS. 5 and 6. The methods shown in FIGS. 7 and 8 may be included in the systems of FIGS. 1-4 and may provide the sequences in FIGS. 5 and 6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Figure 3:
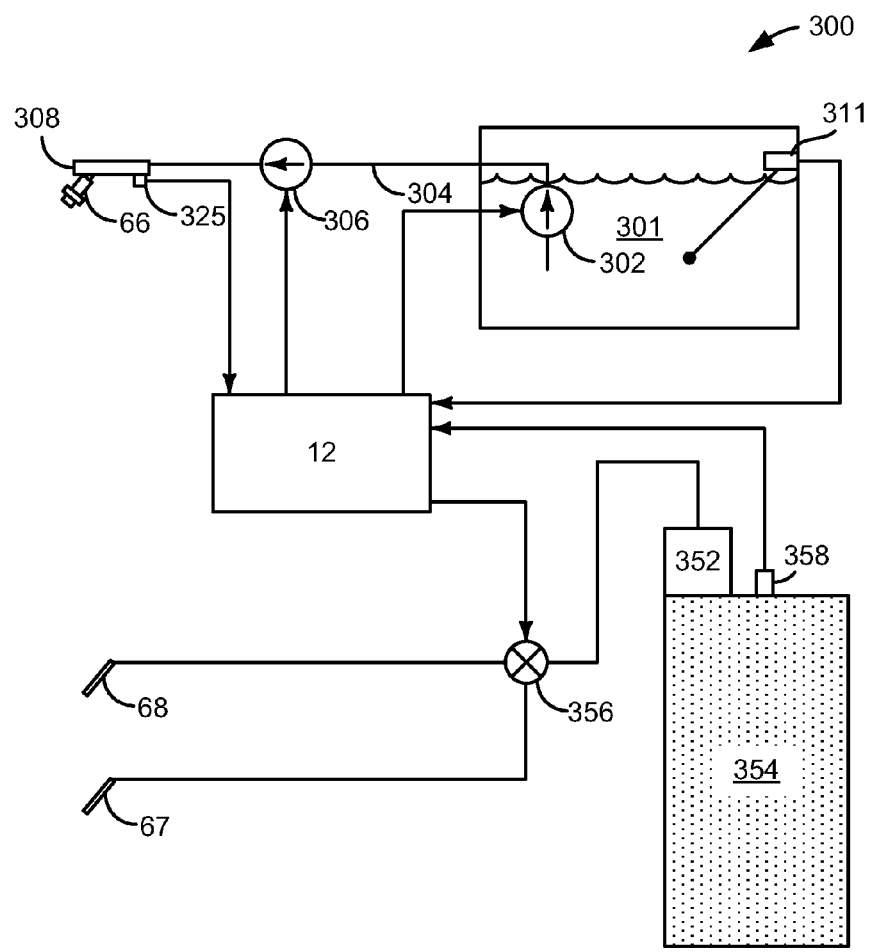
FIGS. 3 and 4 show schematics of example fuel systems.
Figure 4:
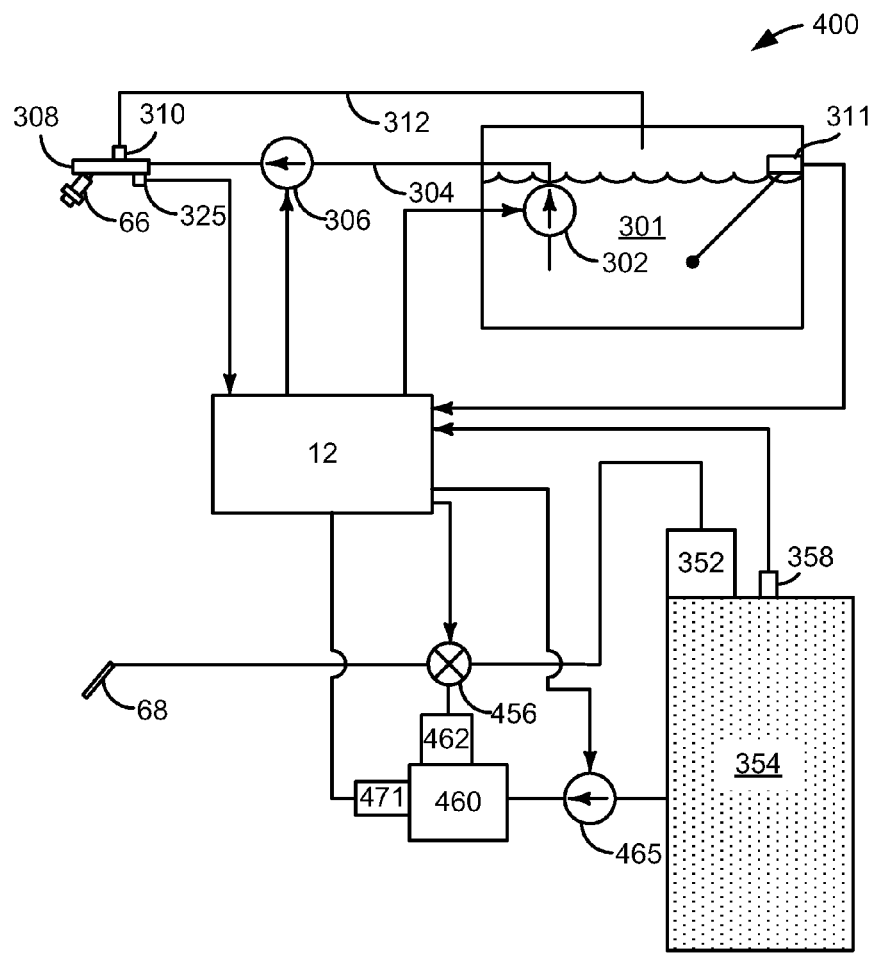

Liquid fuel injector 66 is shown positioned to inject fuel directly into cylinder 30, which is known to those skilled in the art as direct injection. Alternatively, liquid fuel may be injected to an intake port, which is known to those skilled in the art as port injection. Gaseous direct fuel injector 68 supplies gaseous fuel directly into combustion chamber 30. Engine intake injector (e.g., manifold central gaseous injector) 67a injects gaseous into intake manifold 44. Alternatively, engine intake injector (e.g., port gaseous injector) 67b injects gaseous fuel into cylinder intake port 49. Injector 67b is shown as an extended version of injector 67a, but in some examples injector 67b may directly enter cylinder intake port 49 without entering intake manifold 44. Fuel injectors 66, 67a, 67b, and 68 deliver liquid or gaseous fuel in proportion to pulse widths from controller 12. Fuel is delivered to fuel injector 66 by a fuel system (not shown) including a fuel tank, fuel pump, and fuel rail (not shown). Fuel systems supplying fuel to injectors 66, 67a, 67b, and 68 are shown in FIGS. 3 and 4.

Intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft.

Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200. Driveline 200 may be powered by engine 10 in vehicle 290. Engine 10 may be started with an engine starting system shown in FIG. 1. Further, engine 10 may generate or adjust torque via torque actuator 204, such as a fuel injector, throttle, etc.

An engine output torque may be transmitted to torque converter 206 via shaft 275 and impeller 285. Torque converter 206 includes a turbine 286 to output torque to transmission input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to input shaft 270 of transmission 208. Alternatively, the torque converter lock-up clutch 212 may be partially engaged, thereby enabling the amount of torque directly relayed to automatic transmission 208 to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In a similar way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines.

Referring now to FIG. 3, an example fuel system for supplying fuel to engine 10 of FIG. 1 is shown. The fuel system of FIG. 3 may be operated according to the method of FIG. 7. Further, the fuel system of FIG. 3 may be part of a system providing the operating sequence shown in FIG. 5.

Fuel system 300 includes a liquid fuel tank 301 and a gaseous fuel tank 354. The liquid fuel tank 301 may store gasoline, alcohol, or a mixture of gasoline and alcohol. The gaseous fuel tank 354 may store compressed natural gas (CNG), liquefied petroleum gas (LPG which changes state to a gas upon injection), hydrogen, or other gaseous fuel.

Liquid fuel tank 301 includes a fuel level sensor 311 and a fuel pump 302. Fuel pump 302 may be electrically driven via a command from controller 12. Fuel pump 302 may be a low pressure fuel pump and it supplies fuel to high pressure fuel pump 306 via conduit 304. High pressure fuel pump 306 supplies fuel to fuel rail 308 and it distributes fuel to fuel injector 66. High pressure fuel pump 306 may be driven by engine 10. Pressure at fuel rail 308 may be monitored via pressure sensor 325. Controller 12 may adjust an amount of fuel pumped by high pressure fuel pump 306 in response to output of pressure sensor 325.

Gaseous fuel tank 354 includes a pressure sensor 358 for judging an amount of fuel stored in fuel tank 354. Regulator 352 adjusts fuel pressure from fuel tank 354 to a constant pressure when fuel pressure in fuel tank 354 is greater than a threshold pressure. Regulator 352 directs gaseous fuel to three-way valve 356. Three-way valve 356 directs gaseous fuel to direct fuel injector 68 or port fuel injector 67a (or alternatively 67b) based on output from controller 12.

Thus, the system of FIGS. 1-3 provides for a vehicle system, comprising: an engine; a gaseous fuel tank; and a controller including non-transitory instructions for increasing engine idle speed and adjusting a transmission shifting schedule in response to the amount of gaseous fuel stored in the gaseous fuel tank being less than the threshold level. The vehicle system further comprises non-transitory instructions for adjusting a torque converter lock-up schedule in response to the amount of gaseous fuel stored in the gaseous fuel tank being less than the threshold level. The vehicle system further comprises a step ratio transmission, and where adjusting the transmission shifting schedule increases a vehicle speed at which the step ratio transmission is shifted. The vehicle system further comprises adjusting a torque at which the step ratio transmission is shifted. The vehicle system includes where the torque at which the step ratio transmission is shifted is reduced in response to the amount of gaseous fuel stored in the gaseous fuel tank being less than the threshold level. The vehicle system further comprises ceasing direct injection of a gaseous fuel to the engine and starting port injection of the gaseous fuel in response to the amount of gaseous fuel stored in the gaseous fuel tank being less than the threshold level.

Referring now to FIG. 4, a second example fuel system for supplying fuel to engine 10 of FIG. 1 is shown. The fuel system of FIG. 4 may be operated according to the method of FIG. 8. Further, the fuel system of FIG. 4 may be part of a system providing the operating sequence shown in FIG. 6. The fuel system of FIG. 4 includes many of the same components as the fuel system of FIG. 3. Like components between FIG. 3 and FIG. 4 are included in FIG. 4 using the same numeric identifiers. Therefore, for the sake of brevity, the description of like components is omitted from the description of FIG. 4. However, like components operate as described in FIG. 3.

Fuel system 400 includes a gaseous fuel pump 465 which is supplied gaseous fuel from gaseous fuel tank 354. Gaseous fuel pump 465 may be driven by engine 10 or it may be electrically driven. Gaseous fuel pump 465 may be selectively activated and deactivated by controller 12 in response to a fuel amount stored in gaseous fuel tank 354 and/or an amount of liquid fuel stored in fuel tank 301. Gaseous fuel pump 465 may supply pressurized gaseous fuel to accumulator 460, or alternatively three-way valve 456. The output pressure of accumulator 460 may be adjusted to a desired pressure via regulator 462, or the pressure of accumulator 460 may be adjusted by modulating speed or displacement of gaseous fuel pump 465. The operating state (e.g., on/off or pumping capacity) of gaseous fuel pump 465 may be adjusted in response to pressure sensed in accumulator 460 via pressure sensor 471.

In one example, controller 12 supplies gaseous fuel to engine 10 from gaseous fuel tank 354 via pressure regulator 352, three-way valve 456, and direct injector 68 when fuel pressure in fuel tank 354 is greater than a threshold amount. Gaseous fuel pump 465 is deactivated when fuel pressure or the amount of gaseous fuel stored in fuel tank 354 is greater than the threshold amount. Fuel is not supplied to engine 10 via regulator 462 when fuel is supplied to engine 10 via regulator 352. If the amount of fuel stored in gaseous fuel tank is less than the threshold amount, gaseous fuel pump 465 is activated and gaseous fuel is supplied to engine 10 from gaseous fuel tank 354 via gaseous fuel pump 465, accumulator 460, pressure regulator 462, three-way valve 456, and direct fuel injector 68. Fuel is not supplied to engine 10 via regulator 352 when gaseous fuel pump 465 is activated.

Thus, the system of FIGS. 1, 2, and 4 provides for a vehicle system, comprising: an engine; a gaseous fuel tank; a gaseous fuel pump in pneumatic communication with the gaseous fuel tank; and a controller including non-transitory instructions for supplying gaseous fuel to the engine and activating the gaseous fuel pump only when a pressure in the gaseous fuel tank is less than a threshold pressure. The vehicle system further comprises non-transitory instructions for adjusting a torque converter lock-up schedule in response to the pressure in the gaseous fuel tank is less than the threshold pressure. The vehicle system further comprises a fixed gear ratio transmission, and non-transitory instructions for adjusting a transmission shifting schedule in response to the pressure in the gaseous fuel tank being less than the threshold pressure. The vehicle system may further comprise an accumulator positioned downstream of the gaseous fuel pump. The vehicle system further comprises a pressure regulator positioned downstream of the accumulator. The vehicle system may further comprise a direct gaseous fuel injector coupled to the engine.

Figure 5:
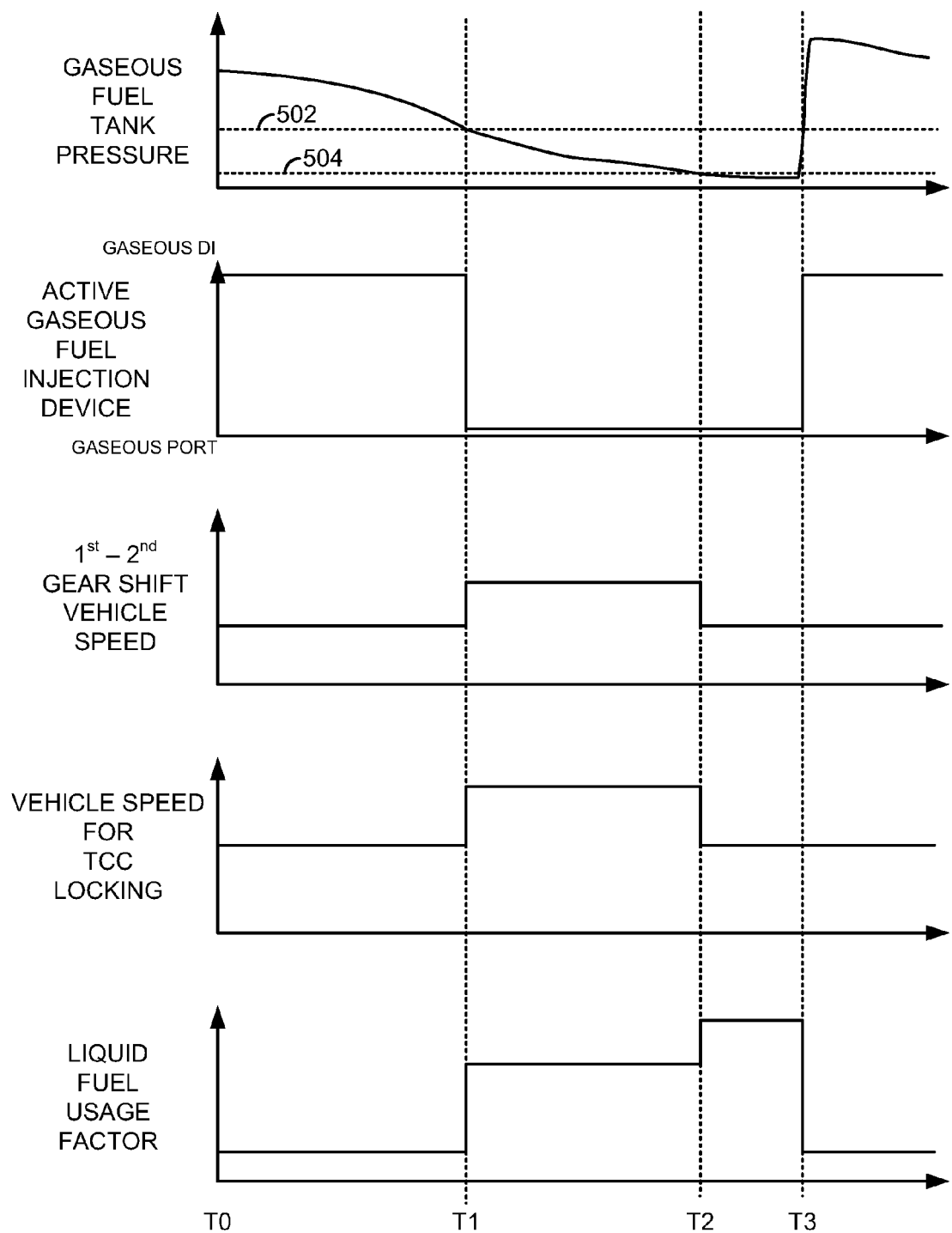
FIGS. 5 and 6 show example vehicle operating sequences.
Figure 7:
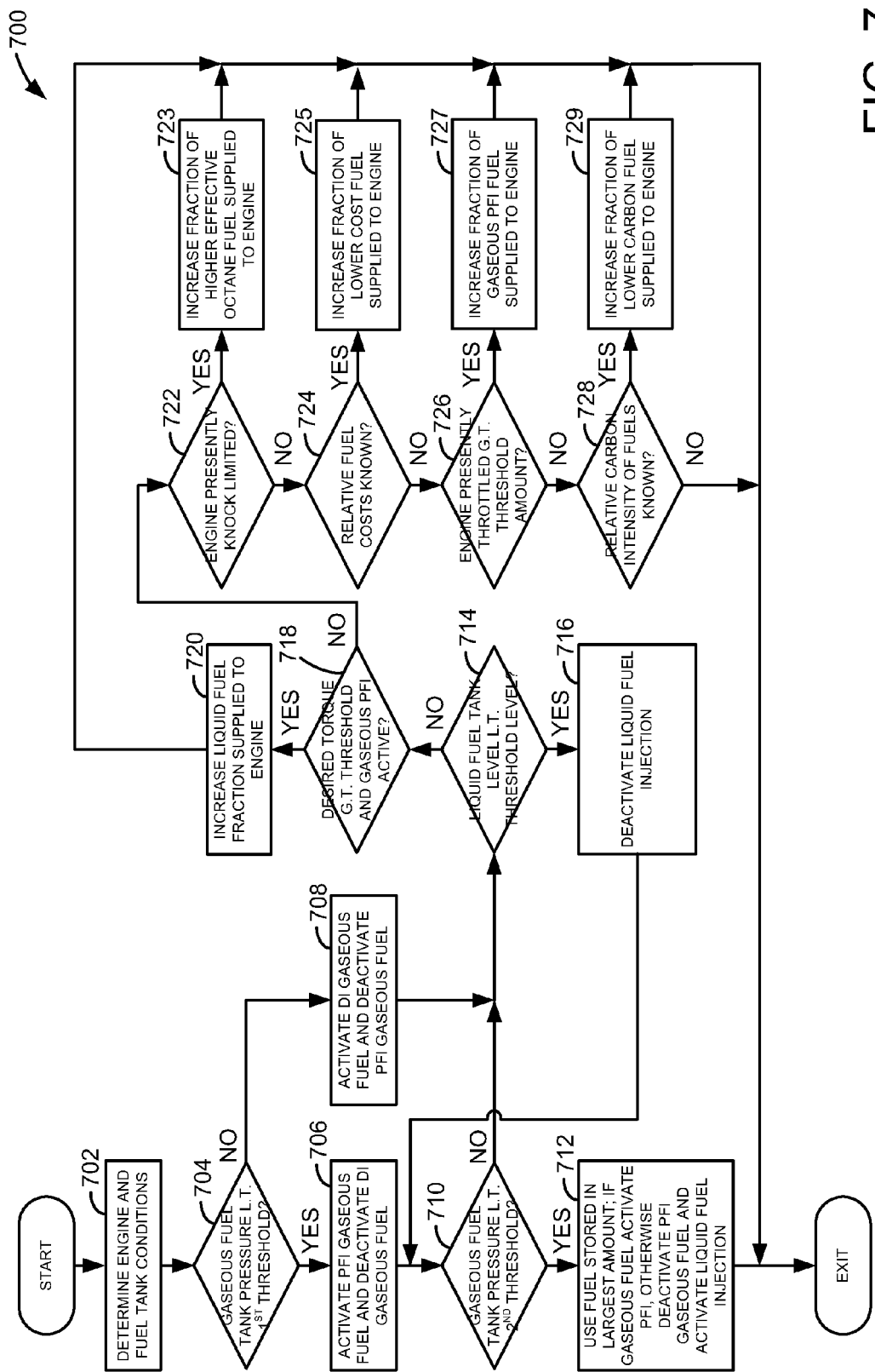

Referring now to FIG. 5, an example vehicle operating sequence according to the method of FIG. 7 is shown. The sequence of FIG. 5 may be provided via the method of FIG. 7 and the system as shown in FIGS. 1, 2, and 3.

The first plot from the top of FIG. 5 is a plot of gaseous fuel pressure in the gaseous fuel tank versus time. The Y axis represents gaseous fuel pressure and the pressure increases in the direction of the Y axis arrow. The X axis represents time and time increases from the left side of the figure to the right side of the figure. Horizontal line 502 represents a first threshold level below which the engine is operated with port or air intake gaseous fuel injectors. The engine operates with direct fuel injectors when the gaseous fuel storage amount is greater than threshold 502. Horizontal line 504 represents a second threshold level below which the engine is operated is operated solely with liquid fuel unless the amount of stored liquid fuel is less than a threshold level.

The second plot from the top of FIG. 5 is a plot of state of the active gaseous fuel injection device versus time. The active gaseous fuel injection device may be a port injector for injecting gaseous fuel into the intake manifold or intake ports, or alternatively, the active gaseous fuel injection device may be a direct fuel injector for injecting fuel directly into an engine cylinder. The active gaseous fuel injection device is the direct fuel injector when the trace is near the Y axis arrow. The active gaseous fuel injection device is the port fuel injector when the trace is near the X axis. The X axis represents time and time increases from the left side of the figure to the right side of the figure.

The third plot from the top of FIG. 5 is an example plot of a scheduled vehicle speed at which first gear to second gear upshift occurs versus time. The Y axis represents scheduled vehicle speed for first gear to second gear upshifts and vehicle speed increases in the direction of the Y axis arrow. The X axis represents time and time increases from the left side of the figure to the right side of the figure. It is to be understood that gear shifting strategy is also a function of engine torque (or a surrogate for torque such as intake manifold pressure or accelerator pedal position). This plot represents upshift speed for a typical engine torque, and the upshift speed for other torques would behave in a similar manner. Likewise, the vehicle speeds for upshifting from second gear to third gear would behave in a similar manner, and so on.

The fourth plot from the top of FIG. 5 is a plot of a scheduled vehicle speed at which the torque converter clutch is locked for a particular selected gear versus time. The Y axis represents scheduled vehicle speed at which the torque converter clutch is locked for a particular selected gear and vehicle speed increases in the direction of the Y axis arrow. The X axis represents time and time increases from the left side of the figure to the right side of the figure. It is understood that torque converter clutch lockup may be scheduled as a function of engine speed rather than vehicle speed, with similar results.

The fifth plot from the top of FIG. 5 is a plot of liquid fuel usage factor versus time. The Y axis represents liquid fuel usage factor and the liquid fuel usage factor increases in the direction of the Y axis arrow. The X axis represents time and time increases from the left side of the figure to the right side of the figure.

At time T0, the pressure of gaseous fuel stored in the gaseous fuel tank is at a higher level. Direct gaseous fuel injection is activated in response to the pressure of gaseous fuel stored in the gaseous fuel tank. The vehicle speed at which a first gear to second gear upshift is scheduled is at a lower vehicle speed so that upshifting occurs earlier in time for a vehicle that is accelerating. The vehicle speed at which the torque converter clutch is locked is scheduled is a lower vehicle speed so that torque converter lockup occurs earlier in time for a vehicle that is accelerating. The liquid fuel usage factor is at a lower level and it indicates that only a small fraction of a total fuel amount supplied to the engine during an engine cycle is comprised of liquid fuel.

Between time T0 and time T1, the pressure of gaseous fuel stored in the gaseous fuel tank is reduced in response to the engine consuming fuel. The direct gaseous fuel injectors remain active, the first gear to second gear upshift schedule is unchanged, the vehicle speed at which the torque converter clutch is locked remains the same, and the liquid fuel usage factor remains the same.

At time T1, the pressure of gaseous fuel stored in the gaseous fuel tank is reduced to less than threshold level 502 as the engine consumes gaseous fuel. Therefore, the active gaseous fuel injector is switched from direct fuel injection to port or intake fuel injection. Further, the vehicle speed at which a first gear to second gear upshift occurs is increased. Likewise, the vehicle speed at which the torque converter clutch is locked is increased in response to the pressure of gaseous fuel stored in the gaseous fuel tank. Additionally, the liquid fuel usage factor is increased so that a greater fraction of a total amount of fuel supplied to the engine during an engine cycle is comprised of liquid fuel.

Between time T1 and time T2, the pressure of gaseous fuel stored in the gaseous fuel tank is reduced further in response to the engine consuming fuel. The port gaseous fuel injectors remain active, the first gear to second gear upshift schedule is unchanged, the vehicle speed at which the torque converter clutch is locked remains the same, and the liquid fuel usage factor remains the same.

At time T2, the pressure of gaseous fuel stored in the gaseous fuel tank is reduced to less than threshold level 504. Consequently, the active gaseous fuel injectors remain the port fuel injectors, but gaseous fuel injection is stopped since there is sufficient liquid fuel available (not shown) to operate the engine. Further, the vehicle speed at which a first gear to second gear upshift occurs is decreased to its former level. Likewise, the vehicle speed at which the torque converter clutch is locked is decreased to its former level in response to switching over to solely injecting liquid fuel. The liquid fuel usage factor is increased so that the engine is supplied solely liquid fuel.

At time T3, the gaseous fuel storage tank is refilled. Consequently, the active gaseous fuel injector is switched to direct injection. The direct gaseous fuel injectors are activated, port gaseous fuel injectors are deactivated, and the liquid fuel usage factor is reduced so that the fraction of liquid fuel supplied to the engine is reduced in response to the gaseous fuel tank being filled to a level greater than 502. The vehicle speed at which a first gear to second gear upshift occurs is at a same level as when only liquid fuel is injected to the engine. Likewise, the vehicle speed at which the torque converter clutch is locked is maintained at the same level as when only liquid fuel is injected to the engine.

Thus, the fuel injector type, gear shift schedule, and torque converter lock schedule are adjusted in response to pressure of fuel stored in the gaseous fuel tank. By changing from direct gaseous fuel injection to port gaseous fuel injection, a greater amount of gaseous fuel stored in the gaseous fuel tank may be utilized since the gaseous fuel may be port injected at a lower fuel pressure; however, the amount of engine torque an power available may be reduced since a portion of cylinder volume is occupied by gaseous fuel that was drawn into the cylinder from the engine air intake. Additionally, adjusting the transmission shift schedule and the torque converter clutch lockup schedule allows the engine to produce additional power when gaseous port fuel injection used, so that there is less possibility of the engine producing less than desired power after a shift or after the torque converter is locked.

Figure 6:
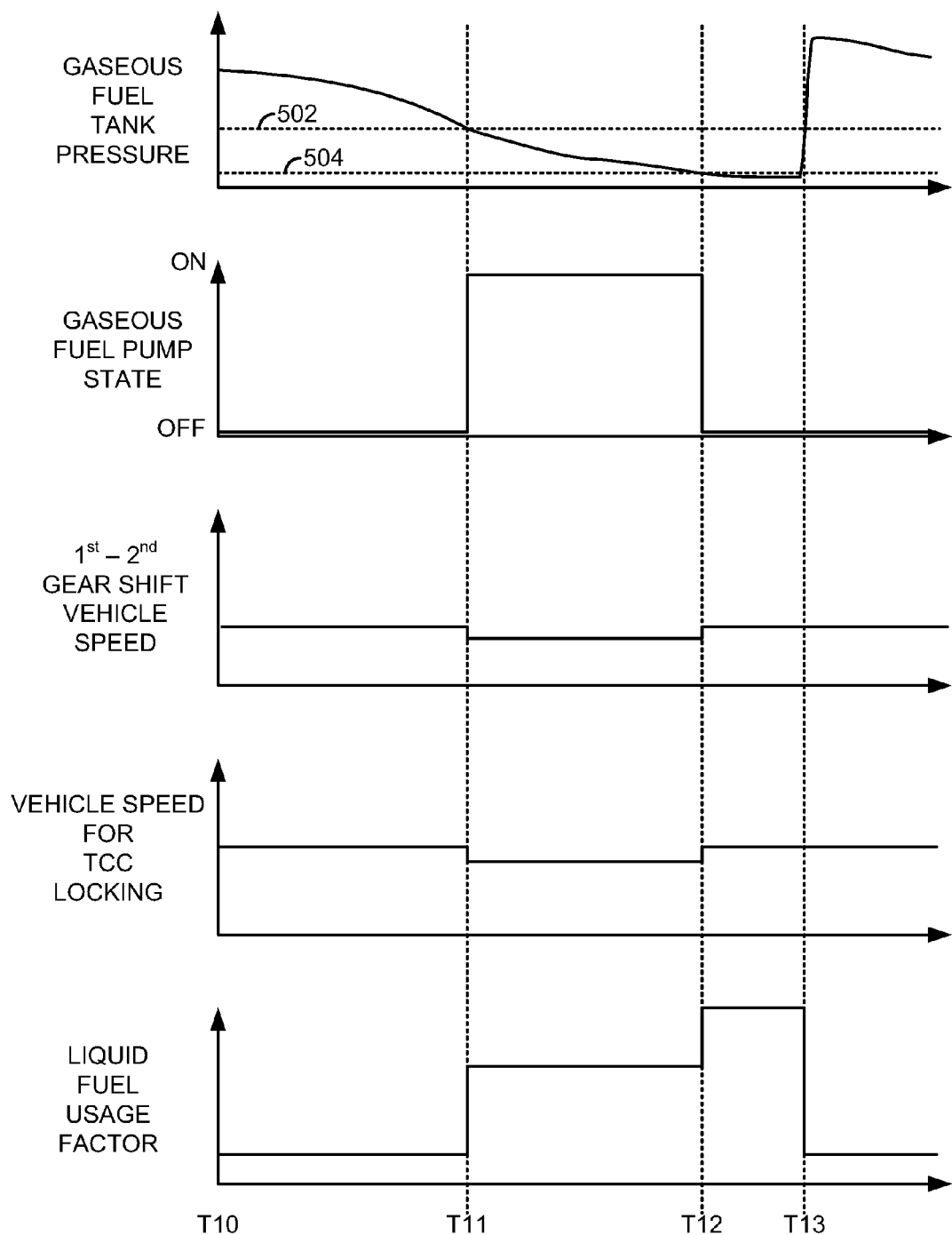

Referring now to FIG. 6, an example vehicle operating sequence according to the method of FIG. 8 is shown. The sequence of FIG. 6 may be provided via the method of FIG. 8 and the system as shown in FIGS. 1, 2, and 4. FIG. 6 includes plots similar to the plots of FIG. 5, except that the second plot of FIG. 6 is a plot of gaseous fuel pump state versus time instead of fuel injection type. Therefore, for the sake of brevity, the description of plots of FIG. 5, similar to the plots in FIG. 6, are not repeated. However, the description of variables from FIG. 5 applies to the same variables in FIG. 6.

The second plot from the top of FIG. 6 is a plot of gaseous fuel pump state versus time. The gaseous fuel pump is activated when the trace it at a higher level. The gaseous fuel pump is deactivated when the trace is at a lower level.

At time T10, the pressure of gaseous fuel stored in the gaseous fuel tank is at a higher level. The gaseous fuel pump is not activated in response to the pressure of gaseous fuel stored in the gaseous fuel tank. The vehicle speed at which a first gear to second gear upshift is scheduled is at standard vehicle speed. The vehicle speed at which the torque converter clutch is locked is scheduled at a standard vehicle speed. The liquid fuel usage factor is at a lower level and it indicates that only a small fraction of a total fuel amount supplied to the engine during an engine cycle is comprised of liquid fuel.

Between time T10 and time T11, the pressure of gaseous fuel stored in the gaseous fuel tank is reduced in response to the engine consuming fuel. The gaseous fuel pump remains active, the first gear to second gear upshift schedule is unchanged, the vehicle speed at which the torque converter clutch is locked remains the same, and the liquid fuel usage factor remains the same.

At time T11, the pressure of gaseous fuel stored in the gaseous fuel tank is reduced to less than threshold level 502. Therefore, the active gaseous fuel pump is activated so that gaseous fuel is supplied to direct injectors at sufficient pressure to enter the cylinder. The vehicle speed at which a first gear to second gear upshift occurs is decreased since engine speed may be limited by the gaseous fuel pump flow capacity. Likewise, the vehicle speed at which the torque converter clutch is locked is reduced since engine speed may be limited while the gaseous fuel pump is activated. Additionally, the liquid fuel usage factor is increased so that a greater fraction of a total amount of fuel supplied to the engine during an engine cycle is comprised of liquid fuel.

Between time T11 and time T12, the pressure of gaseous fuel stored in the gaseous fuel tank is reduced further in response to the engine consuming fuel. The gaseous fuel pump remains active, the first gear to second gear upshift schedule is unchanged, the vehicle speed at which the torque converter clutch is locked remains the same, and the liquid fuel usage factor remains the same.

At time T12, the amount of gaseous fuel stored in the gaseous fuel tank is reduced to less than threshold level 504. As a result, the gaseous fuel pump is deactivated (not shown) and the liquid fuel fraction is increased so that the engine is supplied solely liquid fuel. Additionally, the vehicle speed at which a first gear to second gear upshift occurs is increased to its former level when the gaseous fuel pump was not active. Likewise, the vehicle speed at which the torque converter clutch is locked is increased to its former level in response to switching over to solely injecting liquid fuel.

At time T13, the gaseous fuel storage tank is refilled. Consequently, the direct gaseous fuel injectors are activated and the liquid fuel usage factor is reduced so that the fraction of liquid fuel supplied to the engine is reduced. In this way, gaseous fuel injection and liquid fuel injection are adjusted in response to the gaseous fuel tank being filled to a pressure greater than 502. The vehicle speed at which a first gear to second gear upshift occurs is at a same level as when the gaseous fuel tank was filled to a pressure greater than 502. Likewise, the vehicle speed at which the torque converter clutch is locked is maintained at the same level as when the gaseous fuel tank was filled to a pressure greater than 502.

Thus, the gaseous fuel pump may be activated and deactivated in response to a pressure of gaseous fuel stored in a fuel tank. By operating the gaseous fuel pump, gaseous fuel at a lower pressure can be converted to high pressure gaseous fuel suitable for direct injection. However, in some example, the gaseous fuel flow rate may be limited such that it may be desirable to adjust the gear shift schedules and torque converter lock schedule to shift and lock at lower vehicle speeds.

Referring now to FIG. 7, a method for operating a vehicle is shown. The method may be incorporated into the system of FIGS. 1-3 as executable instructions stored in non-transitory memory. The method of FIG. 7 may provide the operating sequence shown in FIG. 5.

At 702, method 700 determines engine and fuel tank conditions. Engine conditions may include but are not limited to engine speed, driver demand torque, present type of fuel injected, and engine temperature. Fuel tank conditions may include but are not limited to fuel level or amount of fuel stored in a fuel tank, fuel temperature, fuel pressure, fuel pump state (e.g., on or off), and fuel delivery path (e.g., port injection/direct injection). Method 700 proceeds to 704 after engine and fuel tank conditions are determined.

At 704, method 700 judges whether or not gaseous fuel tank pressure is less than (L.T.) a first threshold pressure. The first threshold pressure may be indicative of a fuel pressure for overcoming cylinder pressure to allow fuel into the cylinder while directly injecting fuel to a cylinder. Further, the first threshold pressure may vary with engine operating conditions (e.g., fuel injection timing, engine speed and demand torque). If method 700 judges that the gaseous fuel tank pressure is less than the first threshold pressure, the answer is yes and method 700 proceeds to 706. Otherwise, the answer is no and method 700 proceeds to 708.

At 706, method 700 deactivates direct gaseous fuel injectors and activates port or intake manifold gaseous fuel injectors. The port or intake manifold gaseous injectors are activated so that gaseous fuel may be supplied to the engine cylinders even when pressure in the gaseous fuel tank is too low to support direct injection. Consequently, the vehicle's driving range may be extended as compared to if the engine were only operated with direct gaseous fuel injection. Method 700 proceeds to 710 after port gaseous fuel injectors are activated.

Additionally, when method 700 switches to gaseous port or intake manifold injection from gaseous direct fuel injection, method 700 adjusts engine idle speed, transmission gear shift schedules, and torque converter lockup scheduling. In one example, the engine idle speed is increased when gaseous port fuel injection is activated and gaseous direct fuel injection is deactivated. The amount of increase in engine idle speed may be based on the type of gaseous fuel being injected. For example, if method 700 changes from gaseous fuel direct injection to gaseous fuel port injection, idle speed may be increased by 200 RPM. By increasing idle speed, an amount of time it takes to increase engine torque from a time an increase in torque is requested until the engine produces the requested torque may be reduced. The higher idle speed increases the number of combustion events per second. Therefore, even if a portion of cylinder volume is displaced by gaseous fuel rather than air, engine torque can be increased quickly since torque is provided each combustion event and since a higher idle speed yields more combustion events per second. Additionally, engine idle speed may be increased further in response to operating the engine at lower barometric pressure. For example, if the engine operates at increasing altitude, the engine idle speed may be increased further to improve the engine's torque response while operating the engine with port injected gaseous fuel.

The transmission gear shifting schedule is also adjusted based on the method of gaseous fuel injection. For example, if the engine switches from direct gaseous fuel injection to gaseous port injection, the vehicle speed at which each transmission gear upshift occurs is increased. Thus, a first gear to second gear upshift at a first engine torque demand may be increased from a vehicle speed of 16 Kilometers per hour (Kph) to a vehicle speed of 22 Kph so that engine speed may be maintained at a higher speed after the transmission gear shift. Operating the engine at a higher speed after a shift may allow the engine to produce more power and provide improved performance as compared to if the transmission were shifted at lower vehicle speeds during a period when gaseous fuel is port injected to the engine. The upshifting schedule for higher transmission gears may be adjusted similarly. Downshifting schedules may also be adjusted so that the transmission downshifts at a higher vehicle speed when operated with gaseous fuel port injection as compared to when the engine and vehicle are operated at similar conditions with gaseous fuel direct injection. For example, a third gear to second gear downshift may be scheduled at vehicle speed of 48 Kph when the engine is operated with gaseous port fuel injection and a vehicle speed of 42 Kph when the engine is operated with gaseous direct fuel injection. The downshifting schedule for other transmission gears may be adjusted similarly.

In some examples, the engine or wheel torque where gear upshifts and downshifts occur may also be adjusted similar to the way the vehicle speed upshift gear shifts are adjusted. For example, if the engine transmission is scheduled to upshift from first gear to second gear at 16 Kph and 65 N-m of driver demand or wheel torque when gaseous fuel is directly injected to the engine, the same first gear to second gear upshift may be scheduled at 22 Kph and 80 N-m of driver demand or wheel torque when gaseous fuel is port injected to the engine. Similar shift schedules may be applied to all transmission gears.

The transmission torque converter lockup schedule is also adjusted based on the method of gaseous fuel injection. For example, if the engine switches from direct gaseous fuel injection to gaseous port injection, the vehicle speed (or engine speed) at which the torque converter lockup occurs is increased. Thus, a torque converter lockup may be scheduled for vehicle speed of 88 Kph when the engine receives port injected gaseous fuel while a transmission is in fourth gear. On the other hand, the torque converter lockup may be scheduled for vehicle speed of 80 Kph when the engine receives directly injected gaseous fuel while the transmission is in fourth gear. Increasing the torque converter lockup speed allows the engine speed to be at a higher speed after the torque converter is locked so that the engine may be operating at a speed where the engine has the capacity to produce more power. Consequently, the engine may provide more power in a shorter amount of time as compared to if the engine were operating at a lower speed and receiving fuel via gaseous port fuel injection. However, in some examples the torque converter clutch may be held open while port gaseous injection is enabled so that torque converter impeller speed and engine speed may be greater than if the torque converter clutch was locked, thereby improving the engine's performance.

Additionally, in some examples, a fraction of liquid fuel supplied to the engine during an engine cycle may be increased in response to driver demand or wheel torque exceeding a threshold torque. By increasing the fraction of liquid fuel when gaseous fuel is being port injected, it may be possible to increase engine torque output even when gaseous fuel may be displacing some air from the engine cylinders.

At 710, method 700 judges whether or not gaseous fuel tank pressure is less than (L.T.) a second threshold pressure. The second threshold pressure is less than the first threshold pressure. If so, the answer is yes and method 700 proceeds to 712. Otherwise, the answer is no and method 700 proceeds to 714.

At 712, method 700 uses fuel remaining in the gaseous and liquid fuel tanks to extend the vehicle's driving range even when the amount of fuel stored in the gaseous and liquid fuel tanks is low. In one example, method 700 selects a fuel type to operate the engine with based on the fuel tank that has the greatest amount of stored fuel. For example, if the gaseous fuel tank is one quarter full and the liquid fuel tank is one eighth full, method 700 selects gaseous fuel to operate the engine on and injects the gaseous fuel via port gaseous fuel injectors. In one example, method 700 operates the engine with the selected fuel for a predetermined duration (e.g., amount of time or travel distance) and then switches over to the previously unselected fuel. For example, if the gaseous fuel is selected first, the engine operates with the gaseous fuel for ten minutes and then switches over to operating the engine using liquid fuel for ten minutes and then the engine is operated for another ten minutes with gaseous fuel. If the engine loses power while operating with one fuel, the engine switches over to the other fuel and continues to operate on the selected fuel until the vehicle is refueled or is out of fuel. Method 700 proceeds to exit after selecting fuel to operate the engine with.

At 708, method 700 activates direct gaseous fuel injectors and deactivates port or intake manifold gaseous fuel injectors. The direct gaseous fuel injectors are activated so that gaseous fuel may be supplied to an engine cylinder during the cylinder's compression stroke when intake valves are closed. Consequently, engine power loss due to gaseous fuel injection may be reduced since air in the cylinder is not displaced by gaseous fuel. Method 700 proceeds to 714 after direct gaseous fuel injectors are activated.

Further, when method 700 switches to gaseous direct injection from gaseous port injection, method 700 adjusts engine idle speed, transmission gear shift schedules, and torque converter lockup scheduling. In particular, the engine idle speed is decreased when gaseous direct injection is activated and gaseous port fuel injection is deactivated. The amount of decrease in engine idle speed may be based on the type of gaseous fuel being injected. For example, if method 700 changes from gaseous fuel port injection to gaseous fuel direct injection, idle speed may be decreased by 200 RPM. By decreasing idle speed, it may be possible to reduce engine fuel consumption at idle conditions.

The transmission gear shifting schedule is also adjusted based on the method of gaseous fuel injection. Specifically, if the engine switches from port gaseous fuel injection to gaseous direct injection, the vehicle speed at which each transmission gear upshift occurs is decreased. Thus, a first gear to second gear upshift at a first engine torque demand may be decreased from a vehicle speed of 22 Kilometers per hour (Kph) to a vehicle speed of 16 Kph so that engine speed may be maintained at a lower speed after the transmission gear shift. Operating the engine at a lower speed after a shift may allow the engine to operate at a lower fuel consumption level as compared to if the transmission were shifted at higher vehicle speeds during a period when gaseous fuel is injected to the engine. The upshifting schedule for higher transmission gears may be adjusted similarly. Downshifting schedules may also be adjusted so that the transmission downshifts at a lower vehicle speed when operated with gaseous fuel direct injection as compared to when the engine and vehicle are operated at similar conditions with gaseous fuel port injection. For example, a third gear to second gear downshift may be scheduled at a vehicle speed of 42 Kph when the engine is operated with gaseous direct fuel injection and a vehicle speed of 48 Kph when the engine is operated with gaseous port fuel injection. The downshifting schedule for other transmission gears may be adjusted similarly.

The transmission torque converter lockup schedule is also adjusted based on the method of gaseous fuel injection. For example, if the engine switches from port gaseous fuel injection to gaseous direct injection, the vehicle speed (or engine speed) at which the torque converter lockup occurs is decreased. Thus, a torque converter lockup may be scheduled for a vehicle speed of 80 Kph when the engine receives directly injected gaseous fuel while a transmission is in fourth gear. On the other hand, the torque converter lockup may be scheduled for a vehicle speed of 88 Kph when the engine receives port injected gaseous fuel while the transmission is in fourth gear. Decreasing the torque converter lockup speed allows the engine speed to be at a lower speed after the torque converter is locked which may improve fuel economy.

At 714, method 700 judges whether or not a level or amount of fuel in the liquid fuel storage tank is less than (L.T.) a threshold level or amount. If so, the answer is yes and method 700 proceeds to 716. Otherwise, the answer is no and method 700 proceeds to 718.

At 716, method 700 deactivates injection of liquid fuel. Liquid fuel may be deactivated until the liquid fuel tank is refilled or until pressure of gaseous fuel stored in the gaseous fuel tank is less than a second threshold level. Method 700 proceeds to 710 after liquid fuel is deactivated.

At 718, method 700 judges whether or not a desired driver demand torque is greater than (G.T.) a threshold torque and gaseous port injected fuel is activated. If method 700 judges that port or intake manifold gaseous fuel injection is active and driver demand torque is greater than the threshold torque, the answer is yes and method 700 proceeds to 720. Otherwise, the answer is no and method 700 proceeds to 722.

At 720, method 700 increases a liquid fraction of a total fuel amount delivered to the engine. For example, if a total fuel amount delivered to the engine is comprised of 10% by mass of liquid fuel and 90% of mass gaseous fuel, the mass of liquid fuel may be increased to 15% of the total fuel mass. In other examples, the fuel fraction may be increased based on energy density rather than by fuel mass. For example, if liquid fuel supplies 20% of energy supplied to the engine in an engine cycle, the liquid energy supplied may be increased to 25% of energy supplied to the engine during an engine cycle (e.g., two engine revolutions for a four stroke engine). In one example, the liquid fraction of fuel supplied to the engine during a cylinder cycle is increased by a predetermined amount (e.g., 5%). Method 700 proceeds to exit after the liquid fuel fraction has been increased.

At 722, method 700 judges whether the engine is presently knock limited. In one example, method 700 judges that the engine is knock limited based on predetermined engine knock limits that are stored based on engine speed and load. In other examples, method 700 judges whether or not the engine is presently knock limited based on output of a knock sensor. If method 700 judges that the engine is knock limited the answer is yes and method 700 proceeds to 723. Otherwise, the answer is no and method 700 proceeds to 724.

At 723, method 700 increases the fraction of fuel that has a higher effective octane supplied to the engine. The effective octane of the fuel is based on the fuel injected and the injection path (e.g., direct injection or port injection). For example, a gaseous fuel may have an effective port injection octane of 130 RON and an effective direct injection octane of 140 RON due to improved charge cooling via direct injection and injection timing. On the other hand, the liquid fuel may have an octane rating of 89. Consequently, the fraction of gaseous fuel supplied to the engine is increased. For example, the gaseous fuel fraction may be increased from 80% to 85% of the total amount of fuel supplied to the engine during an engine cycle. Method 700 proceeds to exit after the fraction of fuel having a higher effective octane is increased.

The base fractions of each fuel supplied to the engine may be empirically determined and stored in memory. The base fuel fractions may be indexed based on engine speed and load or requested torque. For example, at 1500 RPM and 0.2 load, fuel supplied to the engine during an engine cycle may be comprised of 95% gaseous fuel and 5% liquid fuel. The gaseous fuel fraction may decrease as engine load increases and vise versa for the liquid fuel fraction.

At 724, method 700 judges whether or not the relative cost of the respective fuels is known. In one example, the driver may input cost of liquid and gaseous fuels to controller 12 via a key pad or user interface. In other examples, the internet or a fuel pump may supply the fuel cost information to controller 12 via wireless interface. If the cost of each fuel supplied to the engine is known, the answer is yes and method 700 proceeds to 725. Otherwise, the answer is no and method 700 proceeds to 726.

At 725, method 700 increases the fraction of fuel of lower cost fuel supplied to the engine. In one example, the cost of each fuel is converted to a gasoline gallon equivalent (GGE) based on the cost and energy in the fuel supplied to the engine. For example, it may be determined that a predetermined mass of gaseous fuel has an equivalent amount of energy as a gallon of gasoline. The predetermined gaseous fuel mass is then multiplied by the cost per unit mass to determine the GGE price of the gaseous fuel. Once the GGE cost of each fuel is determined, method 700 increases the fractional amount of the low cost fuel supplied to the engine relative to the total fuel supplied to the engine. The fractional increase of low cost fuel supplied to the engine may be a predetermined amount up to a predetermined limit. For example, if gaseous fuel supplied to the engine is 10% less expensive than liquid fuel supplied to the engine, the gaseous fuel fraction may be increased by 5% up to a maximum increase of 20%. Method 700 proceeds to exit after the fraction of fuel having a lower cost is increased.

At 726, method 700 judges whether or not the engine is presently throttled by more than a predetermined amount. In one example, method 700 judges whether or not the engine is throttled based on intake manifold pressure. If intake manifold pressure is less than a predetermined amount, it may be determined that the engine is throttled by more than a predetermined amount. If method 700 judges that the engine is throttle by more than a predetermined amount, the answer is yes and method 700 proceeds to 727. Otherwise, the answer is no and method 700 proceeds to 728.

At 727, method 700 increases the fraction of gaseous port or intake manifold injected fuel supplied to the engine. Further, if the engine is presently being directly injected with gaseous fuel, port gaseous fuel injection may be activated. The fraction of port or intake manifold injected gaseous fuel may be increased by a predetermined amount (e.g., 5%) up to a threshold amount (e.g., 95%). By increasing the portion or fraction of port or intake manifold injected fuel, the engine may be operated less throttled so that engine pumping losses may be reduced. Note that the engine throttle may be opened as the fraction of port injected gaseous fuel is increased to provide equivalent torque and air-fuel ratio as compared to when the engine is direct gaseous fuel injected at the same engine speed and torque demand. Method 700 proceeds to exit after the gaseous port injection fuel fraction is increased.

At 728, method 700 judges whether or not the carbon intensities of fuel stored on board the vehicle are known. The carbon intensity may be referred to as a mass of carbon dioxide emissions from a fuel relative to the energy in the fuel. For example, CNG is typically 62 g $CO_2$ per megajoule of energy while gasoline is typically 73 g $CO_2$ per megajoule of energy. In one example, the carbon intensity of fuels stored in the vehicle may be based on information supplied from the internet or a fuel filling station via wireless transmitter. If method 700 judges that the relative carbon intensities of the fuels stored within the vehicle are known, the answer is yes and method 700 proceeds to 729. Otherwise, method 700 exits.

At 729, method 700 increases the fraction of the lower carbon fuel supplied to the engine. For example, if the liquid fuel stored in the vehicle has X grams of carbon per gram of fuel and a gaseous fuel stored in the vehicle has X-Y grams of carbon, method 700 increases the fraction gaseous fuel fraction in a total amount of fuel supplied during an engine cycle. The fraction of gaseous fuel may be increased by a predetermined amount up to a limit. For example, the fraction of gaseous fuel supplied to the engine may increase from 25% to 35% during an engine cycle. Method 700 proceeds to exit after the fraction of low carbon fuel supplied to the engine during an engine cycle is increased.

Thus, the method of FIG. 7 provides for an engine operating method, comprising: directly injecting a gaseous fuel to an engine in response to pressure of gaseous fuel stored in a fuel tank exceeding a threshold level; and increasing an idle speed of the engine and injecting the gaseous fuel to an engine air intake in response to the pressure of gaseous fuel stored in the fuel tank being less than the threshold level.

In one example, the method includes where the engine is operated at a first idle speed while fuel is directly injected to the engine, where the engine is operated at a second idle speed while fuel is engine air intake injected, and where the first idle speed is less than the second idle speed. The method further comprises decreasing the idle speed of the engine in response to the pressure of gaseous fuel stored in the fuel tank being greater than the threshold level. The method further comprises increasing a fraction of liquid fuel in a total amount of fuel supplied to the engine during an engine cycle in response to a desired engine torque exceeding a threshold level. The method further comprises increasing a fraction of liquid fuel in a total amount of fuel supplied to the engine during an engine cycle in response to activating an engine air intake injector. The method includes where the engine air intake injecting the gaseous fuel includes injecting gaseous fuel into an engine intake manifold. The method includes where the engine air intake injecting the gaseous fuel includes injecting gaseous fuel into a cylinder intake port.

The method of FIG. 7 also provides for an engine operating method, comprising: directly injecting a gaseous fuel to an engine in response to pressure of gaseous fuel stored in a fuel tank exceeding a threshold level; and increasing an engine idle speed, adjusting torque converter clutch locking, and engine air intake injecting the gaseous fuel to the engine in response to the amount of gaseous fuel stored in the fuel tank being less than the threshold level. The method includes where the torque converter clutch is held in an open state without locking while engine air intake injecting the gaseous fuel. The method includes where directly injecting the gaseous fuel is deactivated while engine air intake injecting the gaseous fuel. The method also includes where engine air intake injecting the gaseous fuel is deactivated while directly injecting the gaseous fuel. The method includes where adjusting the torque converter clutch locking includes increasing a vehicle speed where the torque converter clutch is locked in response to the amount of gaseous fuel stored in the fuel tank being less than the threshold level. The method further comprises increasing a fraction of liquid fuel in a total amount of fuel supplied to the engine during an engine cycle in response to a desired engine torque exceeding a threshold level.

Referring now to FIG. 8, a method for operating a vehicle is shown. The method may be incorporated into the system of FIGS. 1-2 and 4 as executable instructions stored in non-transitory memory. The method of FIG. 8 may provide the operating sequence shown in FIG. 6.

At 802, method 800 determines engine and fuel tank conditions. Engine conditions may include but are not limited to engine speed, driver demand torque, present type of fuel injected, and engine temperature. Fuel tank conditions may include but are not limited to fuel level or amount of fuel stored in a fuel tank, fuel temperature, fuel pressure, fuel pump state (e.g., on or off), and fuel delivery path (e.g, port injection/direct injection). Method 800 proceeds to 804 after engine and fuel tank conditions are determined.

At 804, method 800 judges whether or not gaseous fuel tank pressure is less than (L.T.) a first threshold pressure. The first threshold pressure may be indicative of fuel pressure to introduce fuel directly to a cylinder during a compress ion stroke of the cylinder. Further, the first threshold may vary with engine operating conditions (e.g., engine speed and demand torque). If method 800 judges that the gaseous fuel tank pressure is less than the first threshold pressure, the answer is yes and method 800 proceeds to 806. Otherwise, the answer is no and method 800 proceeds to 808.

At 806, method 800 activates a gaseous fuel pump to increase pressure of fuel supplied to direct injectors. The gaseous fuel pump is in pneumatic communication with the gaseous fuel storage tank as shown in FIG. 4. The gaseous fuel pump may supply gaseous fuel to direct injectors via a control valve. In one example, the control valve is a three-way valve that selects between gaseous fuel storage tank output and gaseous fuel pump output. The gaseous fuel pump may supply pressurized gaseous fuel to an accumulator tank and output from the accumulator tank may be directed to direct fuel injectors. The gaseous fuel pump may be selectively activated and deactivated depending on pressure at the fuel pump outlet and/or pressure in the accumulator. In examples where the gaseous fuel pump has variable pumping capacity, the pump's capacity may be reduced when pressure in the accumulator is at or above a desired pressure. The gaseous fuel pump's capacity may be increased when pressure in the accumulator is less than desired. Pressure at the outlet of the accumulator may be regulated via a pressure regulator.

In some examples, the gaseous fuel pump may be sized to operate the engine at rated load. However, in other examples, the gaseous fuel pump may be sized with an output capacity that is less than the fuel flow rate to operate the engine at full load with a slightly rich air-fuel ratio (e.g., 0.15 air-fuel ratio richer than stoichiometry).

The transmission gear shifting schedule may also be adjusted based on the activation status of the gaseous fuel pump and amount of gaseous fuel stored in the gaseous fuel storage tank. For example, if the gaseous fuel pump is activated, the engine speed at which each transmission gear upshift occurs may be decreased to avoid exceeding the flow capacity of the gaseous fuel pump. Thus, a first gear to second gear upshift at a first engine torque demand may be decreased from a vehicle speed of 22 Kilometers per hour (Kph) to a vehicle speed of 16 Kph so that the gaseous fuel flow rate may be reduced. In some examples, the throttle opening amount or cam timing or boost pressure may be adjusted to limit engine air flow and torque so that a smaller capacity gaseous fuel pump may supply gaseous fuel to the engine. The upshifting schedule for higher transmission gears may be adjusted similarly. Downshifting schedules may also be adjusted so that the transmission downshifts at a lower vehicle speed when operated with the gaseous fuel pump as compared to when the engine may be supplied gaseous fuel without use of a gaseous fuel pump. For example, a third gear to second gear downshift may be scheduled at a vehicle speed of 42 Kph when the engine is operated with the gaseous fuel pump and at a vehicle speed of 48 Kph when the engine is operated without the gaseous fuel pump. The downshifting schedule for other transmission gears may be adjusted similarly.

The transmission torque converter lockup schedule may also be adjusted based on the operating state of the gaseous fuel pump. For example, if the engine switches from operating without the gaseous fuel pump to operating with the gaseous fuel pump, the vehicle speed (or engine speed) at which the torque converter lockup occurs may be decreased to avoid exceeding the flow capacity of the gaseous fuel pump. Thus, a torque converter lockup may be scheduled for a vehicle speed of 80 Kph when the engine receives gaseous fuel via the gaseous fuel pump while a transmission is in fourth gear. On the other hand, the torque converter lockup may be scheduled for a vehicle speed of 88 Kph when the engine receives gaseous fuel directly from the gaseous fuel tank while the transmission is in fourth gear. Decreasing the torque converter lockup speed allows the engine speed to be at a lower speed after the torque converter is locked so that the engine may be operating at a lower speed to reduce gaseous fuel flow rate.

At 810, method 800 judges whether or not gaseous fuel tank pressure is less than (L.T.) a second threshold pressure. The second threshold pressure is less than the first threshold pressure. If so, the answer is yes and method 800 proceeds to 812. Otherwise, the answer is no and method 800 proceeds to 814.

At 812, method 800 uses fuel remaining in the gaseous and liquid fuel tanks to extend the vehicle's driving range even when the amount of fuel stored in the gaseous and liquid fuel tanks is low. In one example, method 800 selects a fuel type to operate the engine with based on the fuel tank that has the greatest amount of stored fuel. For example, if the gaseous fuel tank is one quarter full and the liquid fuel tank is one eighth full, method 800 selects gaseous fuel to operate the engine on and injects the gaseous fuel via port gaseous fuel injectors. In one example, method 800 operates the engine with the selected fuel for a predetermined duration (e.g., amount of time or travel distance) and then switches over to the previously unselected fuel. For example, if the gaseous fuel is selected first, the engine operates with the gaseous fuel for ten minutes and then switches over to operating the engine using liquid fuel for ten minutes and then the engine is operated for another ten minutes with gaseous fuel. If the engine loses power while operating with one fuel, the engine switches over to the other fuel and continues to operate on the selected fuel until the vehicle is refueled or is out of fuel. Method 800 proceeds to exit after selecting fuel to operate the engine with.

At 808, method 800 deactivates the gaseous fuel pump and supplies gaseous fuel to the engine without a gaseous fuel pump and directly from the gaseous fuel storage tank. Method 800 proceeds to 814 after direct gaseous fuel injectors are activated.

Further, when method 800 switches off the gaseous fuel pump, method 800 may adjusts transmission gear shift schedules and torque converter lockup scheduling. In particular, the transmission gear shifting schedule may also be adjusted based on the operating state of the gaseous fuel pump. Specifically, if the engine switches from operating with the gaseous fuel pump to operating without the gaseous fuel pump, the vehicle speed at which each transmission gear upshift occurs may be increased. Thus, a first gear to second gear upshift at a first engine torque demand may be increased from a vehicle speed of 16 Kilometers per hour (Kph) to a vehicle speed of 22 Kph so that engine power output may be increased if desired. The upshifting schedule for higher transmission gears may be adjusted similarly. The throttle opening amount may be allowed to open to its full extent since the gaseous fuel pump is not limiting fuel flow to the engine. Downshifting schedules may also be adjusted so that the transmission downshifts at a higher vehicle speed when operated without the gaseous fuel pump as compared to when the engine and vehicle are operated at similar conditions with the gaseous fuel pump. For example, a third gear to second gear downshift may be scheduled at a vehicle speed of 48 Kph when the engine is operated without the gaseous fuel pump and at a vehicle speed of 42 Kph when the engine is operated with the gaseous fuel pump. The downshifting schedule for other transmission gears may be adjusted similarly.

The transmission torque converter lockup schedule may also be adjusted based on stopping the gaseous fuel pump. For example, if the engine switches from operating the gaseous fuel pump to operating the engine without the gaseous fuel pump, the vehicle speed at which the torque converter lockup occurs may be increased. Thus, a torque converter lockup may be scheduled for a vehicle speed of 88 Kph when the engine receives gaseous fuel without the gaseous fuel pump while a transmission is in fourth gear. On the other hand, the torque converter lockup may be scheduled for a vehicle speed of 80 Kph when the engine receives gaseous fuel from the gaseous fuel pump while the transmission is in fourth gear. Increasing the torque converter lockup speed allows the engine to be at a higher speed after the torque converter is locked so that the engine may be operating at an engine speed where the engine's torque capacity is increased.

At 814, method 800 judges whether or not a level or amount of fuel in the liquid fuel storage tank is less than (L.T.) a threshold level or amount. If so, the answer is yes and method 800 proceeds to 816. Otherwise, the answer is no and method 800 proceeds to 818.

At 816, method 800 deactivates injection of liquid fuel. Liquid fuel may be deactivated until the liquid fuel tank is refilled or until pressure of gaseous fuel stored in the gaseous fuel tank is less than a second threshold level. Method 800 proceeds to 810 after liquid fuel is deactivated.

At 818, method 800 judges whether or not a gaseous fuel flow rate is greater than (G.T.) a threshold flow and gaseous fuel pump is activated. If method 800 judges that the gaseous fuel flow rate is greater than the threshold rate and that the gaseous fuel pump is active, the answer is yes and method 800 proceeds to 820. Otherwise, the answer is no and method 800 proceeds to 822.

At 820, method 800 increases a liquid fraction of a total fuel amount delivered to the engine. In one example, the liquid fraction of fuel supplied to the engine during a cylinder cycle is increased by a predetermined amount (e.g., 5%). Method 800 proceeds to exit after the liquid fuel fraction has been increased.

At 822, method 800 judges whether the engine is presently knock limited. In one example, method 800 judges that the engine is knock limited based on predetermined engine knock limits that are stored based on engine speed and load. In other examples, method 800 judges whether or not the engine is presently knock limited based on output of a knock sensor. If method 800 judges that the engine is knock limited the answer is yes and method 800 proceeds to 823. Otherwise, the answer is no and method 800 proceeds to 824.

At 823, method 800 increases the fraction of fuel that has a higher effective octane supplied to the engine. The effective octane of the fuel is based on the fuel injected and the injection path (e.g., direct injection or port injection). For example, a gaseous fuel may have an effective port injection octane of 130 RON and an effective direct injection octane of 140 RON due to improved charge cooling via direct injection and injection timing. On the other hand, the liquid fuel may have an octane rating of 89. Consequently, the fraction of gaseous fuel supplied to the engine is increased. For example, the gaseous fuel fraction may be increased from 80% to 85% of the total amount of fuel supplied to the engine during an engine cycle. Method 800 proceeds to exit after the fraction of fuel having a higher effective octane is increased.

At 824, method 800 judges whether or not the relative cost of the respective fuels is known. In one example, the driver may input cost of liquid and gaseous fuels to controller 12 via a key pad or user interface. In other examples, the internet or a fuel pump may supply the fuel cost information to controller 12 via wireless interface. If the cost of each fuel supplied to the engine is known, the answer is yes and method 800 proceeds to 825. Otherwise, the answer is no and method 800 proceeds to 826.

At 825, method 800 increases the fraction of fuel of lower cost fuel supplied to the engine. In one example, the cost of each fuel is converted to a gasoline gallon equivalent (GGE) based on the cost and energy in the fuel supplied to the engine. For example, it may be determined that a predetermined mass of gaseous fuel has an equivalent amount of energy as a gallon of gasoline. The predetermined gaseous fuel mass is then multiplied by the cost per unit mass to determine the GGE price of the gaseous fuel. Once the GGE cost of each fuel is determined, method 800 increases the fractional amount of the low cost fuel supplied to the engine relative to the total fuel supplied to the engine. The fractional increase of low cost fuel supplied to the engine may be a predetermined amount up to a predetermined limit. For example, if gaseous fuel supplied to the engine is 10% less expensive than liquid fuel supplied to the engine, the gaseous fuel fraction may be increased by 5% up to a maximum increase of 20%. Method 800 proceeds to exit after the fraction of fuel having a lower cost is increased.

At 826, method 800 judges whether or not the engine is presently throttled by more than a predetermined amount. In one example, method 800 judges whether or not the engine is throttled based on intake manifold pressure. If intake manifold pressure is less than a predetermined amount, it may be determined that the engine is throttled by more than a predetermined amount. If method 800 judges that the engine is throttle by more than a predetermined amount, the answer is yes and method 800 proceeds to 827. Otherwise, the answer is no and method 800 proceeds to 828.

At 827, method 800 increases the fraction of gaseous port or intake manifold injected fuel supplied to the engine. Further, if the engine is presently being directly injected with gaseous fuel, port gaseous fuel injection may be activated. The fraction of port or intake manifold injected gaseous fuel may be increased by a predetermined amount (e.g., 5%) up to a threshold amount (e.g., 95%). By increasing the portion or fraction of port or intake manifold injected fuel, the engine may be operated less throttled so that engine pumping losses may be reduced. Note that the engine throttle may be opened as the fraction of port injected gaseous fuel is increased to provide equivalent torque and air-fuel ratio as compared to when the engine is direct gaseous fuel injected at the same engine speed and torque demand. Method 800 proceeds to exit after the gaseous port injection fuel fraction is increased.

At 828, method 800 judges whether or not the carbon intensities of fuel stored on board the vehicle are known. The carbon intensity may be referred to as a mass of carbon dioxide emissions from a fuel relative to the energy in the fuel. In one example, the carbon intensity of fuels stored in the vehicle may be based on information supplied from the internet or a fuel filling station via wireless transmitter. If method 800 judges that the relative carbon intensities of the fuels stored within the vehicle are known, the answer is yes and method 800 proceeds to 829. Otherwise, method 800 exits.

At 829, method 800 increases the fraction of the lower carbon fuel supplied to the engine. For example, if the liquid fuel stored in the vehicle has X grams of carbon per gram of fuel and a gaseous fuel stored in the vehicle has X-Y grams of carbon, method 800 increases the fraction gaseous fuel fraction in a total amount of fuel supplied during an engine cycle. The fraction of gaseous fuel may be increased by a predetermined amount up to a limit. Method 800 proceeds to exit after the fraction of low carbon fuel supplied to the engine during an engine cycle is increased.

Thus, the method of FIG. 8 provides for an engine operating method, comprising: directly injecting a gaseous fuel to an engine in response to a pressure of a gaseous fuel stored in a fuel tank exceeding a threshold pressure; and activating a gaseous fuel pump only when the pressure of gaseous fuel stored in the fuel tank is less than or equal to the threshold level. The method includes where a direct injector is supplied fuel from the fuel tank without a gaseous fuel pump in response to the pressure of gaseous fuel stored in the fuel tank exceeding the threshold pressure.

In one example, the method includes where the direct injector is supplied fuel from the gaseous fuel pump in response to the pressure of the gaseous fuel stored in the fuel tank being less than or equal to the threshold level. The method further comprises a three-way valve and adjusting a state of the three-way valve in response to the pressure of gaseous fuel stored in the fuel tank. The method further comprises regulating output of the gaseous fuel pump to a desired pressure. The method includes where the threshold pressure is varied with engine operating conditions.

The method of FIG. 8 also provides for an engine operating method, comprising: directly injecting a gaseous fuel to an engine in response to a pressure of a gaseous fuel stored in a fuel tank exceeding a threshold pressure; and activating a gaseous fuel pump, adjusting torque converter clutch locking, and adjusting a transmission gear shift schedule in response to the pressure of the gaseous fuel stored in the fuel tank being less than or equal to the threshold pressure. The method includes where adjusting the transmission gear shift schedule includes adjusting a vehicle speed at which a transmission shifts gears. The method includes where the vehicle speed at which the transmission shifts gears is decreased in response to activating the gaseous fuel pump. The method includes where adjusting torque converter clutch locking includes adjusting a vehicle speed at which the torque converter clutch locks.

In some examples, the method includes where the vehicle speed at which the torque converter locks is decreased in response to activating the gaseous fuel pump. The method further comprises adjusting an operating state of a three-way valve that is in fluidic communication with the gaseous fuel pump and the fuel tank. The method includes where the gaseous fuel pump supplies fuel to a direct injector. The method includes where the direct injector is supplied gaseous fuel via the fuel tank without the fuel passing through the gaseous fuel pump.

As will be appreciated by one of ordinary skill in the art, method described in FIGS. 7 and 8 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
   directly injecting a gaseous fuel to an engine in response to a pressure of gaseous fuel stored in a fuel tank exceeding a threshold level; and
   increasing an idle speed of the engine and injecting the gaseous fuel to an engine air intake in response to the pressure of gaseous fuel stored in the fuel tank being less than the threshold level.

2. The method of claim 1, where the idle speed is a speed at which the engine rotates when driver demand torque is zero and when engine speed is adjusted to a substantially constant speed.

3. The method of claim 1, where the engine is operated at a first idle speed while fuel is directly injected to the engine, where the engine is operated at a second idle speed while fuel is engine air intake injected, and where the first idle speed is less than the second idle speed.

4. The method of claim 3, further comprising decreasing the idle speed of the engine in response to the pressure of gaseous fuel stored in the fuel tank being greater than the threshold level.

5. The method of claim 1, further comprising increasing a fraction of liquid fuel in a total amount of fuel supplied to the engine during an engine cycle in response to a desired engine torque exceeding a threshold level.

6. The method of claim 1, further comprising increasing a fraction of liquid fuel in a total amount of fuel supplied to the engine during an engine cycle in response to activating an engine air intake injector.

7. The method of claim 1, where injecting the gaseous fuel to the engine air intake includes injecting gaseous fuel into an engine intake manifold.

8. The method of claim 1, where injecting the gaseous fuel to the engine air intake includes injecting gaseous fuel into an engine intake port.

9. An engine operating method, comprising:
   directly injecting a gaseous fuel to an engine in response to a pressure of gaseous fuel stored in a fuel tank exceeding a threshold level; and
   increasing an engine idle speed, adjusting torque converter clutch locking, and engine air intake injecting the gaseous fuel to the engine in response to the pressure of gaseous fuel stored in the fuel tank being less than the threshold level.

10. The method of claim 9, where the torque converter clutch is held in an open state without locking while engine air intake injecting the gaseous fuel.

11. The method of claim 9, where directly injecting the gaseous fuel is deactivated while engine air intake injecting the gaseous fuel.

12. The method of claim 11, where adjusting the torque converter clutch locking includes increasing a vehicle speed where the torque converter clutch is locked in response to the pressure of gaseous fuel stored in the fuel tank being less than the threshold level.

13. The method of claim 12, further comprising increasing a fraction of liquid fuel in a total amount of fuel supplied to the engine during an engine cycle in response to a desired engine torque exceeding a threshold level.

14. The method of claim 9, where engine air intake injecting the gaseous fuel is deactivated while directly injecting the gaseous fuel.

15. A vehicle system, comprising:
   an engine;
   a gaseous fuel tank; and
   a controller including non-transitory instructions for increasing engine idle speed and adjusting a transmission shifting schedule in response to a pressure of gaseous fuel stored in the gaseous fuel tank being less than a threshold level.

16. The vehicle system of claim 15, further comprising non-transitory instructions for adjusting a torque converter lock-up schedule in response to the pressure of gaseous fuel stored in the gaseous fuel tank being less than the threshold level.

17. The vehicle system of claim 15, further comprising a step ratio transmission, and where adjusting the transmission shifting schedule increases a vehicle speed at which the step ratio transmission is shifted.

18. The vehicle system of claim 17, further comprising non-transitory instructions for adjusting a torque at which the step ratio transmission is shifted.

19. The vehicle system of claim 18, where the torque at which the step ratio transmission is shifted is reduced in response to the pressure of gaseous fuel stored in the gaseous fuel tank being less than the threshold level.

20. The vehicle system of claim 15, further comprising non-transitory instructions for ceasing direct injection of a gaseous fuel to the engine and starting engine intake injection of the gaseous fuel in response to the pressure of gaseous fuel stored in the gaseous fuel tank being less than the threshold level.

* * * * *